United States Patent [19]

Wetter

[11] Patent Number: 5,006,136
[45] Date of Patent: Apr. 9, 1991

[54] ROTARY DRUM FILTER

[76] Inventor: Peter Wetter, Im Rigiblick 23, 8623 Wetzikon, Switzerland

[21] Appl. No.: 453,578

[22] Filed: Dec. 20, 1989

[30] Foreign Application Priority Data

Jan. 10, 1989 [CH] Switzerland .......................... 67/89-1

[51] Int. Cl.⁵ .................... B01D 33/044; B01D 46/20
[52] U.S. Cl. ........................................ 55/290; 55/296; 55/302
[58] Field of Search ................... 55/290, 295, 296, 302

[56] References Cited

U.S. PATENT DOCUMENTS

| | | | |
|---|---|---|---|
| Re. 24,521 | 8/1958 | Young | 55/290 |
| 1,862,839 | 6/1932 | Brelsford et al. | 55/290 |
| 2,639,780 | 5/1953 | Hardy | 55/295 X |
| 2,795,291 | 6/1957 | Pierce | 55/290 |
| 3,421,291 | 1/1969 | Messen-Jaschin | 55/295 X |
| 3,572,011 | 3/1971 | Wilhelmsson | 55/302 X |
| 3,754,378 | 8/1973 | Christensen et al. | 55/290 X |
| 4,140,503 | 2/1979 | Vandergriff | 55/295 X |
| 4,266,953 | 5/1981 | Matthys et al. | 55/302 X |
| 4,325,717 | 4/1982 | Crowley, Jr. | 55/296 X |
| 4,470,913 | 9/1984 | Kieronski | 55/290 X |
| 4,506,625 | 3/1985 | Vöhringer | 55/302 X |
| 4,519,821 | 5/1985 | Weber et al. | 55/296 X |
| 4,710,207 | 12/1987 | Bodovsky et al. | 55/296 X |
| 4,826,512 | 5/1989 | Fuller | 55/290 X |
| 4,830,642 | 5/1989 | Tatge et al. | 55/302 X |

FOREIGN PATENT DOCUMENTS

| | | |
|---|---|---|
| 438371 | 12/1971 | Australia . |
| 0075403 | 3/1983 | European Pat. Off. . |
| 40930 | 9/1887 | Fed. Rep. of Germany . |
| 1071457 | 12/1959 | Fed. Rep. of Germany ........ 55/290 |
| 201234 | 2/1939 | Switzerland . |
| 2736 | of 1911 | United Kingdom . |

*Primary Examiner*—Robert Spitzer
*Attorney, Agent, or Firm*—Laff, Whitesel, Conte & Saret

[57] ABSTRACT

The rotating drum filter includes a filter cake cleaning-off unit operating with pressurized air for cleaning the filter cake off the outer jacket surface of a horizontally lying drum. The filter cake that has been removed shall not be given the chance to subsequently settle on the outer jacket surface due to an air-flow. To this end, the housing of the filter is partitioned vertically in an upper filter zone and a lower filter cake settling zone, with the exception of a cleaning-off zone located between these zones, which partition is made as air-tight as possible. The bottom of the upper filter zone includes discharge flaps via which filtered air deposited in the upper filter zone is removed. Accordingly, such dust can no more settle onto the jacket surface of the drum.

9 Claims, 2 Drawing Sheets

ROTARY DRUM FILTER

BACKGROUND OF THE INVENTION

1. Field of the Invention

The present invention relates to a rotary drum filter having a drum which is rotatable around a substantially horizontal axis and having a filter cake cleaning-off unit, which drum and which cleaning-off unit are located inside of a filter housing that includes a raw air inlet, a clean air outlet and a filter cake discharge section, whereby the raw air inlet faces the outer jacket surface of the drum and the clean air outlet faces the inner jacket surface of the drum.

2. Description of the Prior Art

Such a rotary drum filter is generally known, and its filter cake cleaning-off unit operates with pressurized air in order to detach or remove, respectively, the filter cake from the outer jacket surface of the drum. Accordingly, the jet of pressurized air is directed in the mentioned rotary drum filter design from within the drum towards the inner jacket surface of the drum, flows therethrough and throws the filter cake located on the outer jacket surface of the drum off towards the outside. Known rotary drum filters of the above mentioned design incorporate the drawback that due to the impact of the pressurized air the filter removed from the drum does not fall downwards in a compact state, but rather dust thereof is raised, which again reaches the outer jacket surface of the drum. Accordingly, the air-flows within the housing of the filter are responsible for such happening, which air-flows prevent a compact setting of the dust in a settling space (bin, container, trough) for such dust.

SUMMARY OF THE INVENTION

Hence, a general object of the invention is to provide a rotary drum filter by means of which the above mentioned drawback may be avoided, such that accordingly it is possible to avoid the dust, having been cleaned off by the cleaning-off unit, from reaching anew the outer jacket surface of the drum.

A further object of the present invention is to provide a rotary drum filter having a filter housing which comprises a vertically upper filter zone and a filter cake settling zone located below the filter zone such that the filter housing is partitioned into two zones, whereby a part of the partitioning plane is formed as cleaning-off zone and the rest of the partitioning plane is formed substantially air-tight.

BRIEF DESCRIPTION OF THE DRAWING

The present invention will be better understood and objects other than those set forth above will become apparent when consideration is given to the following detailed description thereof. Such description makes reference to the annexed drawing, wherein.

DESCRIPTION OF THE PREFERRED EMBODIMENT

Figure 1:
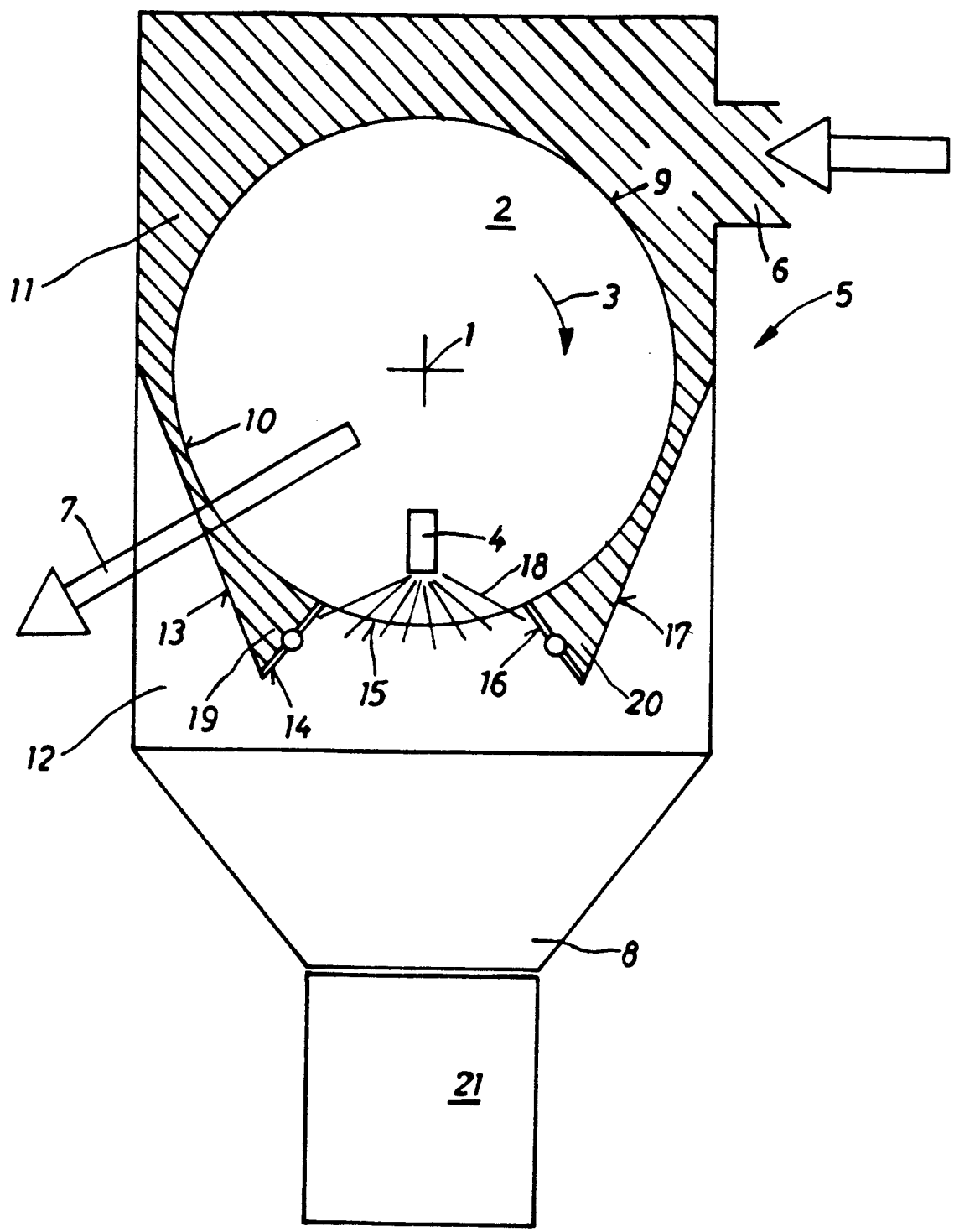
FIG. 1 illustrates a schematic front view of the horizontally lying drum of a rotary drum filter structured in accordance with the present invention.

The rotary drum filter includes a drum 2 which is rotatable around an axis 1. It shall be assumed that the drum 2 is able to rotate intermittently in the direction of an arrow 3 in this embodiment. A filter cake cleaning-off unit is located at the inside of the drum 2. The drum 2 and the filter cake cleaning-off unit 4 are located within a filter housing 5, which includes a raw air inlet 6, a clean air outlet 7 and a filter cake discharge 8, whereby the raw air inlet 6 faces the outer jacket surface 9 of the drum 2. The clean air outlet 7 faces the inner jacket surface 10 of the drum, such that accordingly the clean air is discharged coaxially out of the inner area of the drum 2.

The filter housing 5 is partitioned vertically into an upper filter zone 11 and a filter cake settling zone 12 located thereunder, and whereby for better understanding the upper filter zone 11 is identified in FIG. 1 by a hatching. A partition plane or section, respectively, is located between the two zones 11 and 12 and consists of members 13 to 17. The member 15 of the partition plane is formed as cleaning-off sector and accordingly when cleaning the filter cake off the jet 18 of pressurized air is directed against this sector 15. The rest of the partition plane, ie members 13, 14, 16 and 17 include at least one flap that can be opened and be closed such to allow a selective opening and thus connecting of the filter zone 11 to the filter cake settling zone 12. The two surface or plane parts 14 and 16 of the partition plane of the illustrated example are shaped as flaps, which two flaps 14 and 16 are illustrated more in detail in FIG. 2. The partition surface 13 to 17 shall be designed as air-tight as possible up to the cleaning sector 15 which means that the two parts 13 and 17 are mounted in air-tight manner at the upper end of the housing 5 and that, furthermore, the two flaps 14 and 16 are to abut at their two flap ends as air-tight as possible onto the outer jacket surface 9 of the drum 2 and at the other end at the members 13 and 17, respectively, such that accordingly the raw air must penetrate from the filter zone 11 through the outer and the inner jacket surface 9, 10 of the drum 2.

Figure 2:
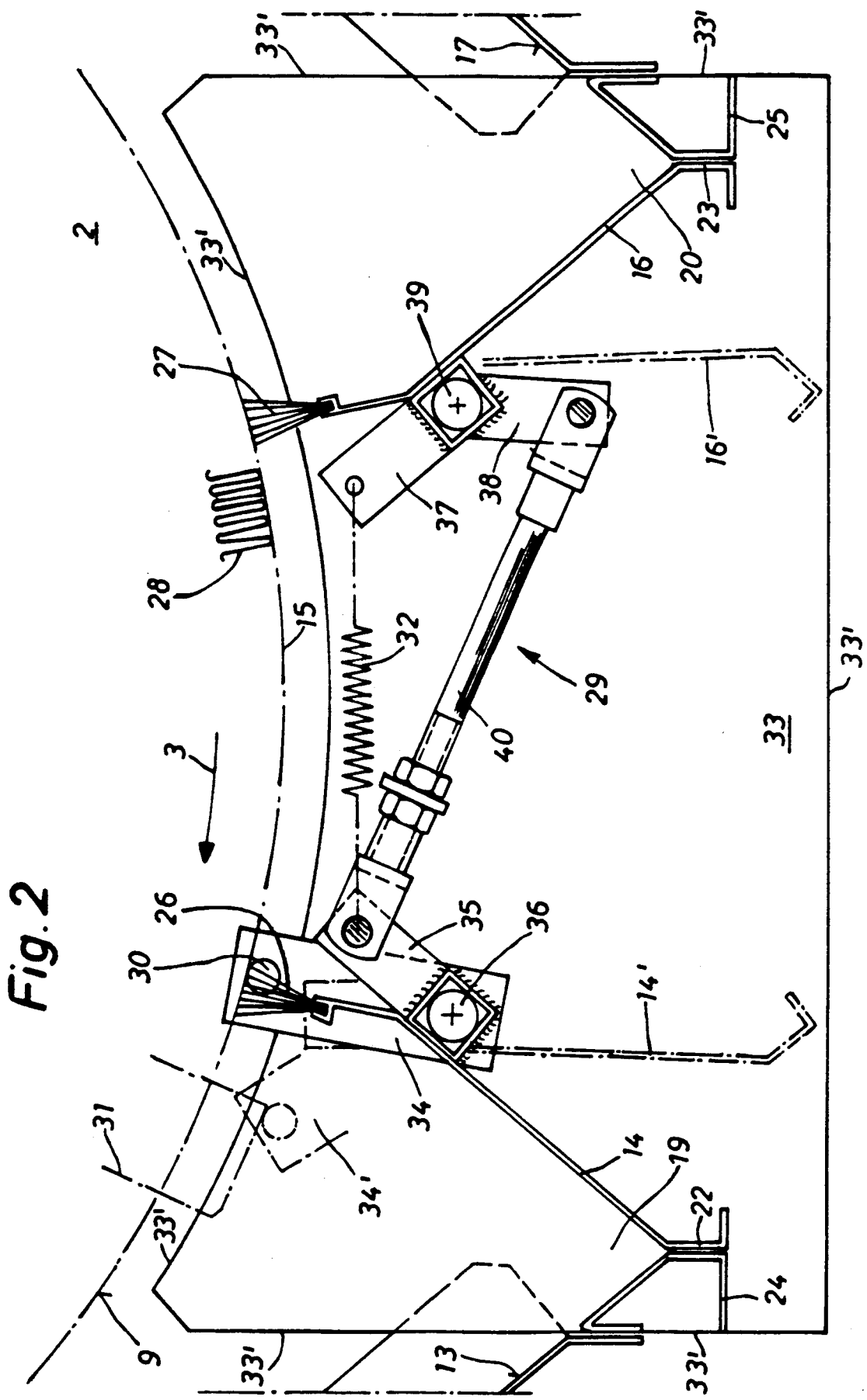
FIG. 2 illustrates schematically a detail of the lower part of the rotary drum filter of FIG. 1.

FIGS. 1 and 2 disclose that the section 13 and the flap 14 of the partition plane form together a pocket 19 of the filter zone 11, and it can be stated that the flap 14 is located at the bottom of this pocket 19. In a similar manner the section 17 and the flap 16 of the partition plane form a second pocket 20. The two pockets 19 and 20 are located together with their flaps 14 and 16 at both sides of the cleaning-off zone 15 and immediately adjacent thereto. Each pocket 19, 20 of the illustrated example has a V-shape, whereby one of the legs of the V-shape of the pocket 19 is formed by the flap 14 and the other leg of the V-shape is formed by the section 13 of the partition plane. The pocket 20 has also a V-shape, whereby the one leg of the V-shape is formed by the flap 16 and the other leg of the V-shape is formed by the section 17 of the partition plane. Both sections 13 and 17 are designed as chute such that dust deposited thereon can glide downwards into the pockets 19 and 20. The filter cake discharge 8 of the housing 5 includes also obliquely extending walls, and has accordingly also the shape of a hopper, such that the filter cake falling downwards or dust that has been detached from the filter cake may fall into a settling space located thereunder, which in the illustrated example is designed as a bucket 21.

The design of the two flaps 14 and 16 and their operation for an opening or closing, respectively thereof is illustrated in detail in FIG. 2. The position of the two flaps 14 and 16 illustrated in solid lines represent the closed state of the two flaps 14 and 16, in which state they abut at their lower ends 22 and 23, respectively, sealingly the housing parts 24 and 25, respectively. These housing parts 24 and 25 follow in turn sealingly the two mentioned sections 13 and 17 of the partition plane. The flap 14 carries at its end facing the drum 2 a brush 26 intended to abut in an elastic manner the outer jacket surface 9 of the drum 2. The flap 16 carries a brush 27 in the same fashion. Accordingly, the brushes 26 and 27 define or limit, respectively, the cleaning off zone 15 and contact sealingly the filter material 28 of the drum 2, whereby only a small section of this filter material 28 is illustrated in FIG. 2. The opened state of the two flaps identified by 14' and 16' are illustrated by broken lines.

The two flaps 14 and 16 are interconnected by a linkage 29 allowing a simultaneous opening or closing of both flaps 14, 16. The linkage 29 includes an abutment 30 for an operating cam 31 of the drum 2 for an opening of the two flaps 14 and 16 against the force of a spring 32. The two flaps 14 and 16, the linkage 29, the spring 32 and the abutment 30 are assembled in a drum filter-insert 33 having the outer contour 33' that is part of the filter cake settling zone 12 and which can be inserted into the rest of the filter housing or be removed therefrom, respectively.

The flap 14 is rigidly connected to an arm 34 supporting the abutment 30 and to a further arm 35. These three structural members 14, 34 and 35 are pivotable around a pivot pin 36 inserted rigidly in the insert 33. The flap 16 is rigidly connected to an arm 37 and to a further arm 38, whereby the structural members 16, 37 and 38 can be pivoted around a pivot pin 39 which is again rigidly inserted or seated, respectively, in the insert 33. The two arms 35 and 38 are hingedly interconnected by means of a coupling bar 40. The spring 32 is pivotably mounted on the one end to the arm 37 and on the other end to the arm 35. The two flaps 14 and 16 are held by means of this tension spring 32 in their closed position. During the intermittent rotation of the drum 2, the operation cam 31 comes to contact the abutment 30 and pivots the arm 34 into the position 34' illustrated with dash-dotted lines. This follows in a movement of the two flaps 14 and 16 into their opened position 14' and 16'. After the operation cam 31 has left the abutment 30, the spring 32 pulls the two flaps 14 and 16 again into their closed position. In this position of the flaps 14, 16 a filtering of the raw air takes place.

In order to clean the filter cake off, the pressurized air jet 18 is directed from the jet nozzle 4 against the cleaning-off section 15, whereupon the filter cake which is then detached falls downwards into the bucket 21. Thereafter, the drum 2 is rotated intermittently by the angle of circumference of the cleaning-off zone 15 further in the direction of the arrow 3, whereby the operation cam 31 opens both flaps 14 and 16. Thus, filtered dust located in the filter zone 11 and specifically in the two pockets 19 and 20 is led downwards into the bucket 21, during which this filter dust slides downwards along the two sections 13 and 17 acting as chutes. Accordingly, the pockets 19 and 20 have been emptied. Upon a slight further rotation of the drum 2, the two flaps 14 and 16 are again closed, and the filtering of the raw air is begun anew. It is possible to open and thereafter close the two flaps 14 and 16 once or several times during a short time per full rotation of the drum 2. The intermittent further rotation of the drum 2 can occur e.g. every few minutes.

While there is shown and described a present preferred embodiment of the invention, it is to be distinctly understood that the invention is not limited thereto, but may be otherwise variously embodied and practiced within the scope of the following claims.

I claim:

1. A rotary drum filter having a drum which is rotatable around a substantially horizontal axis and having a filter cake cleaning-off unit, which drum and which cleaning-off unit are located inside a filter housing that includes a raw air inlet, a clean air outlet and a filter cake discharge section, which raw air inlet faces an outer jacket surface of said drum and which clean air outlet faces an inner jacket surface of said drum, said filter housing comprising a vertically upper filter zone and a filter cake settling zone located below said filter zone such that the filter housing is partitioned into two zones, whereby a part of a partitioning plane is formed as cleaning-off zone and the rest of the partitioning plane is formed substantially air-tight.

2. The rotary drum filter of claim 1, wherein said filter cake cleaning-off unit comprises an air jet device located such within said drum that its air exit port faces said inner jacket surface of the drum, whereby an air flow is directed against said inner jacket surface at said cleaning-off zone such to clean off of said outer jacket surface from the filter cake.

3. The rotary drum filter of claim- 1, wherein said rest of the partitioning plane comprises at least one openable and closeable flap allowing a selective opening and conclusively connecting of said filter zone to said filter cake settling zone.

4. The rotary drum filter of claim 3, wherein said rest of the partitioning plane forms at least one pocket of the filter zone and wherein said at least one flap is located at the bottom of said at least one pocket.

5. The rotary drum filter of claim 4, wherein said at least one pocket has a V-shape in which the one leg of the V-shape is formed by said at least one flap and the other leg thereof by a chute.

6. The rotary drum filter of claim 4, wherein two pockets, each having one flap, are provided, of which one each is located at both sides and adjacent of said cleaning-off zone.

7. The rotary drum filter of claim 6, wherein the two flaps are interconnected by a linkage such to allow a simultaneous opening and closing of the two flaps, and wherein said linkage comprises an abutment for an operating cam of said drum for an opening of both flaps against the force of a spring.

8. The rotary drum filter of claim 7, wherein both flaps, said linkage, said spring and said abutment are assembled in a drum filter insert which forms part of said filter cake settling zone and is insertable into and retrievable out of, respectively, the rest of the housing of the filter.

9. The rotary drum filter of claim 3, wherein each flap carries a brush at its end facing the drum, intended for an elastic abutting at the outer jacket surface of the drum.

* * * * *